United States Patent [19]
Ebbinghaus

[11] Patent Number: 5,205,187
[45] Date of Patent: Apr. 27, 1993

[54] HOLLOW SHAFT

[75] Inventor: Alfred Ebbinghaus, Aalen, Fed. Rep. of Germany

[73] Assignee: Gesenkschmiede Schneider GmbH, Aalen, Fed. Rep. of Germany

[21] Appl. No.: 855,144

[22] Filed: Mar. 20, 1992

Related U.S. Application Data

[63] Continuation of Ser. No. 737,561, Jul. 26, 1991, abandoned, which is a continuation-in-part of Ser. No. 625,642, Dec. 7, 1990, abandoned, which is a continuation of Ser. No. 301,886, Jan. 4, 1989, filed as PCT/DE88/00179, Mar. 22, 1988, abandoned.

[30] Foreign Application Priority Data

May 12, 1987 [DE] Fed. Rep. of Germany ....... 3715813
Jun. 22, 1987 [DE] Fed. Rep. of Germany ....... 3720597

[51] Int. Cl.⁵ .................... F16H 53/00; B21D 39/00
[52] U.S. Cl. ..................... 74/567; 123/90.6; 29/888.1; 29/523
[58] Field of Search ............ 74/567, 569; 123/90.6, 123/90.31; 29/523, 421.1, 888.1, 156.4 R, 522.1; 72/58

[56] References Cited

U.S. PATENT DOCUMENTS 4,708,029 11/1987 Urano ................................ 29/523
4,774,852 10/1988 Matt ................................. 74/567

FOREIGN PATENT DOCUMENTS 3303629 9/1983 Fed. Rep. of Germany ........ 74/567
3323640 1/1984 Fed. Rep. of Germany ........ 74/567
3346486 7/1984 Fed. Rep. of Germany ........ 74/567
3401057 7/1984 Fed. Rep. of Germany ........ 74/567
3720597 8/1988 Fed. Rep. of Germany ........ 74/567
0017816 2/1978 Japan ................................ 74/567
0059062 3/1986 Japan ................................ 74/567
0130725 6/1987 Japan ................................ 29/523
0141357 6/1987 Japan ................................ 74/567
0199906 9/1987 Japan ............................... 123/90.6
1115093 5/1968 United Kingdom ............... 74/567

*Primary Examiner*—Vinh T. Luong
*Attorney, Agent, or Firm*—Kalish & Gilster

[57] ABSTRACT

A hollow shaft is provided with torque transmitting structural elements, such as gear wheels, cams, disk cams, etc. At least one structural element has a noncircular opening for mounting on a discharge pipe (12) with a substantially identical wall thickness and with at least one support body (20) between the pipe (12) and each structural element (14) with noncircular opening. The discharge pipe (12) is so widened by internal pressure for frictional connection to the structural elements (14) that cover a portion thereof that the circumference of the pipe (12) engages on the inner wall of the structural elements (14) and another portion of the pipe circumference engages on the outer wall of the support body (20). Each support body (20) is constructed as a separate component from the structural elements.

5 Claims, 2 Drawing Sheets

HOLLOW SHAFT

This is a continuation of application Ser. No. 07/737,561, filed on Jul. 26, 1991, now abandoned, which is a continuation-in-part of application Ser. No. 07/625,642, filed on Dec. 7, 1990, abandoned, which is a continuation of application Ser. No. 07/301,886, filed on Jan. 4, 1989, filed as PCT/DE88/00179, Mar. 22, 1988, now abandoned.

BACKGROUND OF THE INVENTION

Field of the Invention

The invention relates, in general, to the field of hollow shafts provided with torque transmitting structural elements, such as gear wheels, cams, disk cams, etc., and more particularly, to a hollow shaft providing a support body constructed as a separate component from the torque transmitting structural elements.

SUMMARY OF THE INVENTION

Multipart hollow shafts, which can also be called built-up hollow shafts and which are produced by joining a pipe and structural elements, such as cams or the like are known. German Patent Application DE-OS 34 01 057 discloses such a hollow shaft, in which a support body constructed in one piece with a structural element having a noncircular opening is provided. However, said hollow shaft is disadvantageous in that it is necessary to use structural elements with complicated shapes and different wall thicknesses, which are complicated and costly to manufacture. Particularly in the case of mass produced products, such as said hollow shafts, complicated and costly parts should be avoided.

An object of the invention is consequently to provide a built-up hollow shaft, which can be produced with more easily manufacturable structural elements. According to the invention this problem is solved in that each support body is constructed as a separate component.

Accordingly, in furtherance of the above object, the invention comprises, briefly, a hollow shaft provided with torque transmitting structural elements mounted along the length thereof, such as gear wheels, cams, disk cams, etc. At least one structural element has a noncircular opening for mounting on a discharge pipe provided with substantially identical wall thickness. At least one support body is disposed between the pipe and each structural element with a noncircular opening. The starting material pipe is so widened by internal pressure for frictional connection to the structural elements that cover a portion of the circumference thereof that the pipe engages an inner wall of the structural element and another portion of the pipe circumference engages an outer wall of the support body. The hollow shaft is characterized in that each support body is constructed as a component separate from the structural elements.

Due to the fact that in the present invention structural elements without integral support bodies do not have to be manufactured by complicated and expensive processes, as with the cam of the above cited DE-OS 34 01 057, and can instead be obtained in simple manner e.g. by separating from a pipe with a uniform wall thickness given the desired cross-sectional shape by an inexpensive shaping process, the manufacture of the hollow shaft can be simplified and therefore take place more economically, as is in particular required with hollow shafts used in large numbers in automotive engineering.

Other objects and features will be in part apparent and in part pointed out hereinbelow.

DESCRIPTION OF THE PREFERRED EMBODIMENTS

The structural elements with the noncircular opening can have a uniform wall thickness according to a preferred embodiment, as hereafter described.

According to a preferred embodiment of the invention, the thickness of wall 16a of the pipe 12a can at least partly be increased. A method for the production of this embodiment is described in the earlier-dated German Patent Application P 37 04 092.8 (copending as U.S. patent application Ser. No. 07/274,809), the pipe widening being brought about by internal pressure with simultaneous material supply in the direction of the pipe axis and while forming a wall reinforcement under the structural elements.

The hollow shaft can also be provided with a partly reduced size of the noncircular opening of the structural element (14a), such as e.g. by shrinking on or partially increasing the pipe external diameter, as can also take place after introducing subcooled inner parts into the openings of the structural elements and subsequent widening of the inner parts.

Thus, the preferred form of such hollow shafts can be produced by the insertion of the hollow shaft components into a mold and while introducing a starting material pipe (sometimes hereafter, "pipe") and at least one support body into the opening of a structural element and applying to the pipe and internal pressure adequate for the deformation thereof and optionally accompanied by material supply in the direction of the pipe axis, while applying in the pipe interior a pressure adequate for the deformation of the pipe material and application of forces in the direction of the pipe axis. Material supply may be brought about by means of tool elements of the mold which are displaceable in the direction of the tube axis.

Simultaneously with the fixing of the structural elements, this method also permits the shaping of secondary elements, such as hexagons or rings on the pipe. The pipe can be of a metallic or non-metallic material, optionally a laminated material or a fiber-reinforced material of different types.

The structural elements can e.g. be of metal, cast iron, chilled cast iron, sintered steel, steel (e.g. fine stampings or sectional steel), aluminum, titanium, or also non-metals, ceramics, plastics or composite materials.

If the support bodies are made from a material with a higher thermal expansion coefficient than that of the structural element, during the operation of the shaft an improved strength of the pipe-structural element union occurs due to heat action.

In a particularly preferred embodiment of the invention, in which the structural elements have substantially a constant wall thickness, for the first time it is possible to use structural elements hardened to the requisite strength, which provide a high resilience and therefore a better fixing.

The invention makes it possible to obtain lighter built-up hollow shafts than was hitherto possible with a better fixture of the structural element to the pipe.

Figure 1:
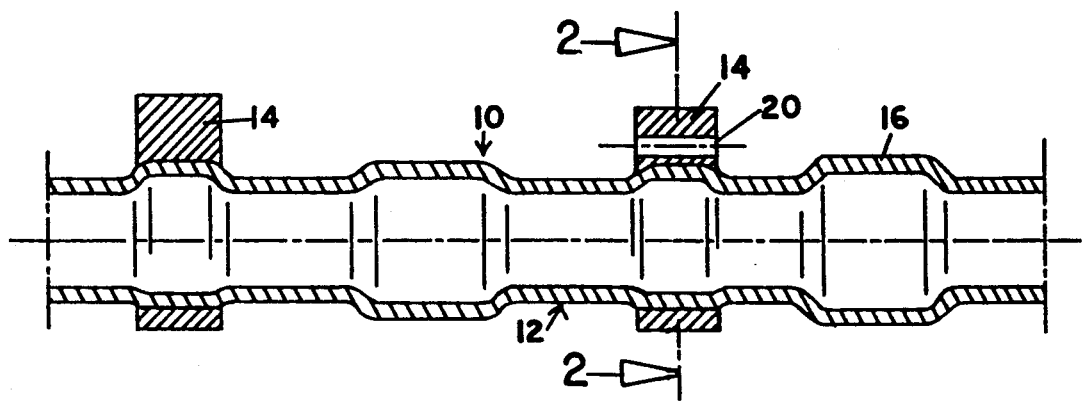
FIG. 1 is a schematic longitudinal sectional view of a cam shaft constructed in accordance with and embodying the present invention.

As shown in FIG. 1, an inventive hollow shaft 10 has various structural elements 14. Through widening the pipe 12, while engaging a cam 14 against the pipe inner wall of the oval bore defined by cam 14 and a support body 20, here a pipe portion but alternatively a profile piece, such as a dowel or bar-shaped piece, or an adaptor sleeve), the structural element 14 is positively (non-fictionally, form-fit) and non-positively (fictionally form-fit) connected to pipe 12 such that support body 20 is fictionally held therebetween (FIG. 2).

Figure 2:
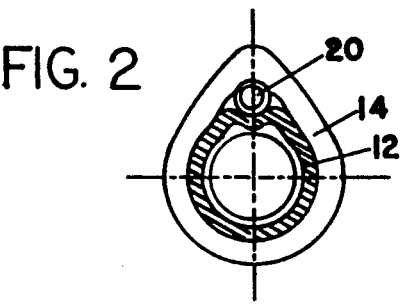
FIG. 2 is a cross-section of the cam shaft of FIG. 1 taken on line 2—2.

FIG. 2 shows the embodiment of FIG. 1 (in cross-section along the line 2—2), in which the support body 20 constructed separately from the cam is a pipe section. The deformation of pipe 12 under structural element 14 leads to a bulge with a depression shaped in accordance with the profile of support body 20.

Figure 3:
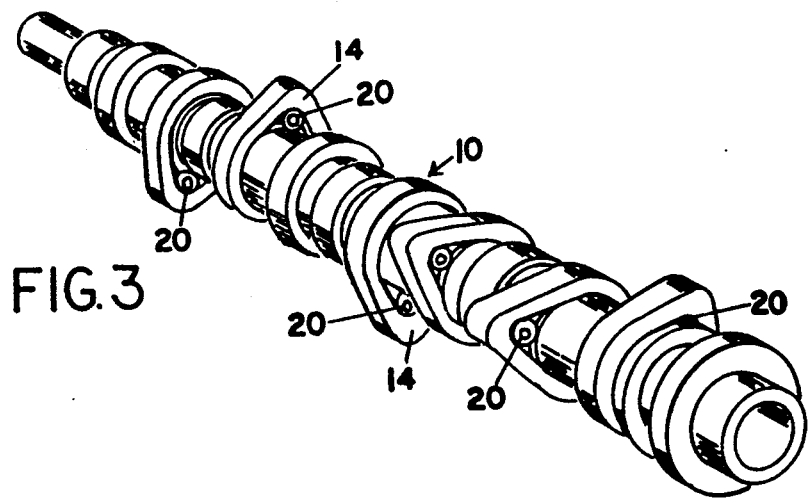
FIG. 3 is a perspective view of a cam shaft constructed in accordance with and embodying the present invention.

FIG. 3 shows hollow shaft (camshaft 10) in perspective, having a plurality of structural elements or cams 14 positioned circumferentially along the length thereof.

Figure 4:
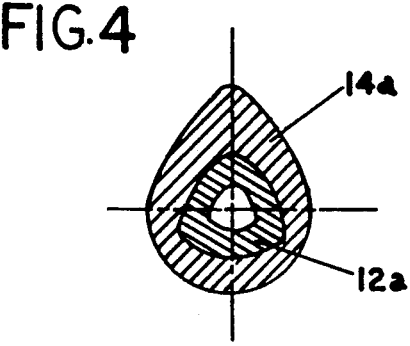
FIG. 4 is a cross-sectional view of an alternative embodiment of the cam shaft of the present invention.

An alternative embodiment of the new camshaft 10 is shown in cross-section in FIG. 4 which illustrates a noncircular opening 32 defined by cam 14a and tube 12a expanded therein, as previously described.

Figure 5:
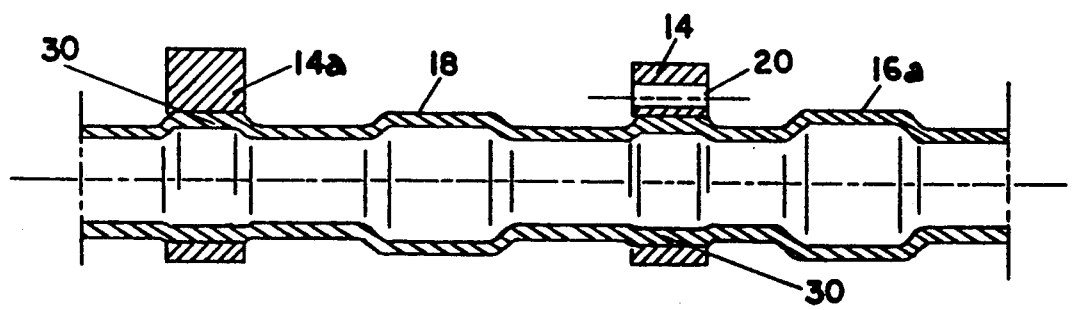
FIG. 5 is a longitudinal sectional view of the cam shaft of FIG. 4.

FIG. 5 shows a longitudinal section of the hollow shaft of FIG. 4 and illustrates the thickened wall 30 beneath structural element 14a. (Provided as described in copending U.S. patent application Ser. No. 07/274,809).

Figure 6:
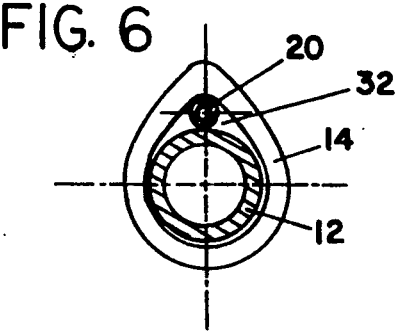
FIG. 6 is a cross-sectional view of the cam shaft of FIG. 1 prior to its finished state.

FIGS. 6 and 2 illustrate a cross-section of the new hollow shaft 10 before completion thereof (FIG. 6) and after expansion of tube 12 therein (FIG. 2). FIG. 6b also makers clear how a narrower (partially reduced) portion of structural element 14, as well as a partial increase in the diameter of pipe 12, as at 13, creates an interlocking connection, or form-fit, as previously described.

What is claimed is:

1. A hollow shaft with torque transmitting structural elements mounted along a length thereof, said hollow shaft comprising at least one torque transmitting structural element having a noncircular opening for mounting on a pipe provided with a substantially identical wall thickness and having at least one support body disposed between the pipe and the structural element, said structural element being provided with the noncircular opening into which the pipe is widened by internal pressure for positive and nonpositive connection to the structural element that covers a portion of the circumference thereof so that the pipe engages an inner wall of the structural element and another portion of the circumference thereof engages an outer wall of the one support body, wherein the support body is constructed as a component separate from any structural element, further characterized in that the structural element has a uniform wall thickness that is provided with the noncircular opening and still further characterized in that the wall of the pipe is provided with an increased thickness under each structural element.

2. Hollow shaft according to claim 1, wherein the pipe is made from a laminated material.

3. Hollow shaft according to claim 1, wherein the at least one support body is a profile piece.

4. Hollow shaft according to claim 1, wherein the noncircular openings of each structural element is oval.

5. Hollow shaft according to claim 1, wherein each at least one support body is made from a material with a higher heat expansion coefficient than a heat expansion coefficient of each structural element.

* * * * *